Feb. 16, 1926.

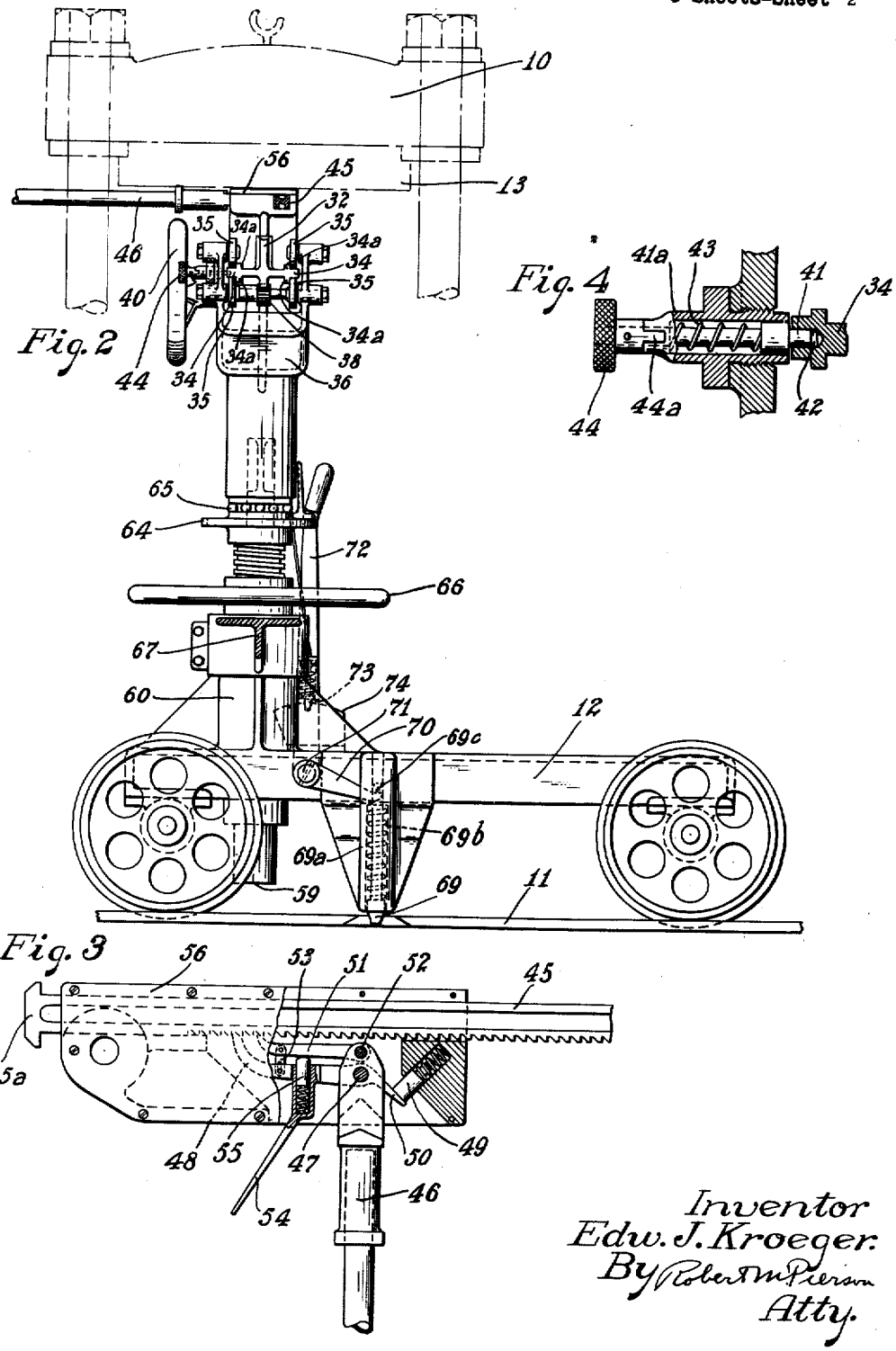

E. J. KROEGER 1,573,497

METHOD AND APPARATUS FOR MAKING HOLLOW ARTICLES

Filed March 25, 1922 5 Sheets-Sheet 3

Inventor
Edw. J. Kroeger.
By Robert M Pierson
Atty.

Feb. 16, 1926.  
E. J. KROEGER  
1,573,497  
METHOD AND APPARATUS FOR MAKING HOLLOW ARTICLES  
Filed March 25, 1922   5 Sheets-Sheet 4
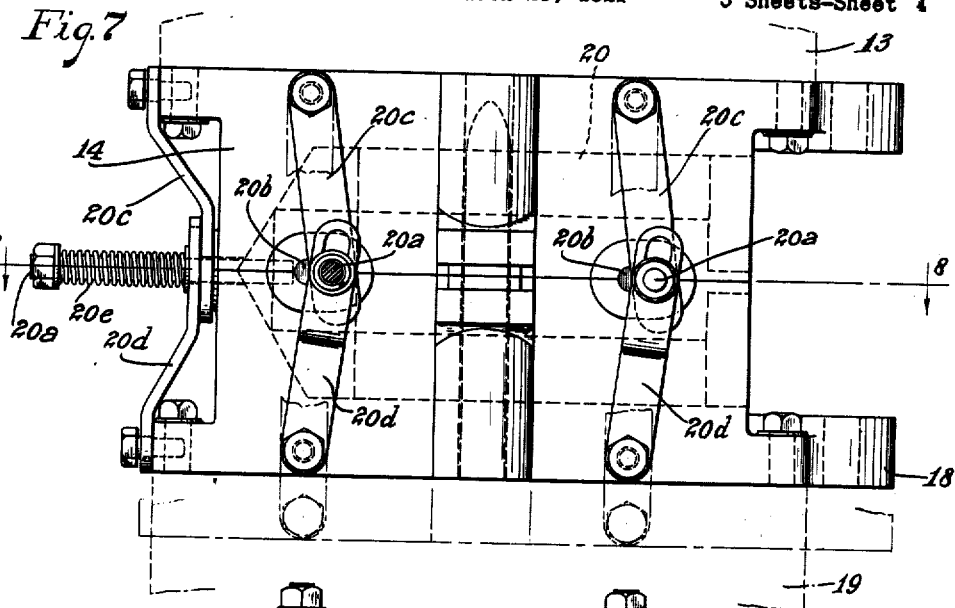
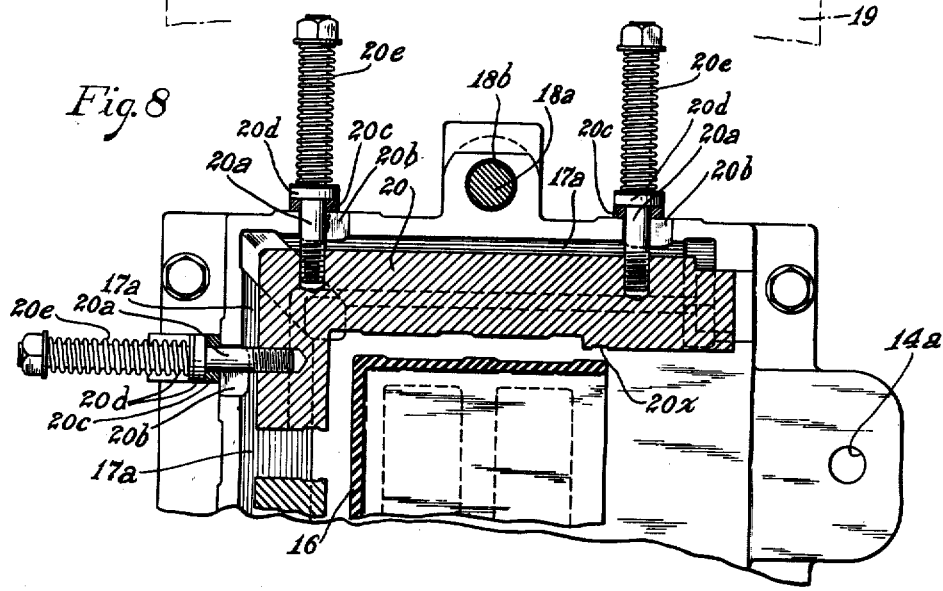
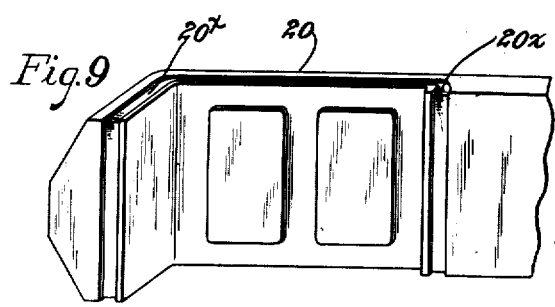
Inventor
Edw. J. Kroeger
By Robert M. Pierson
Atty.

Feb. 16, 1926.
E. J. KROEGER
1,573,497
METHOD AND APPARATUS FOR MAKING HOLLOW ARTICLES
Filed March 25, 1922
5 Sheets-Sheet 5
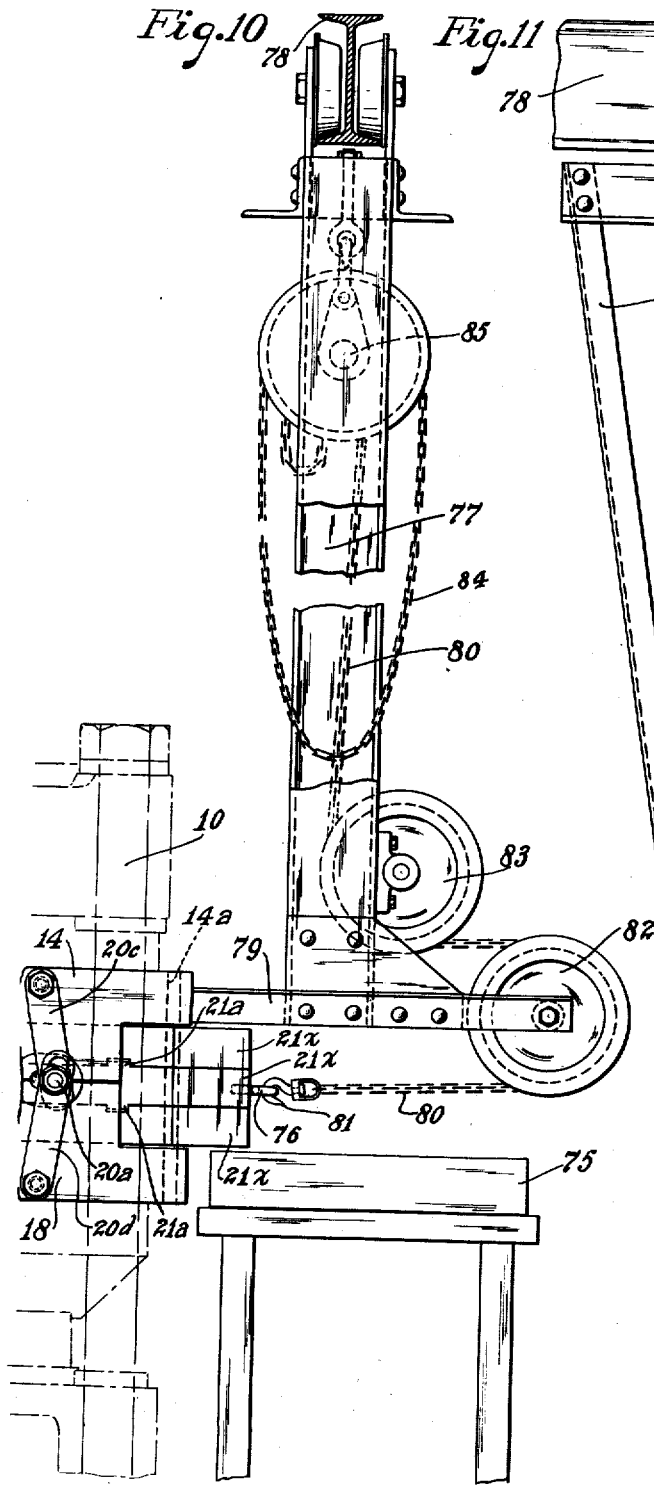
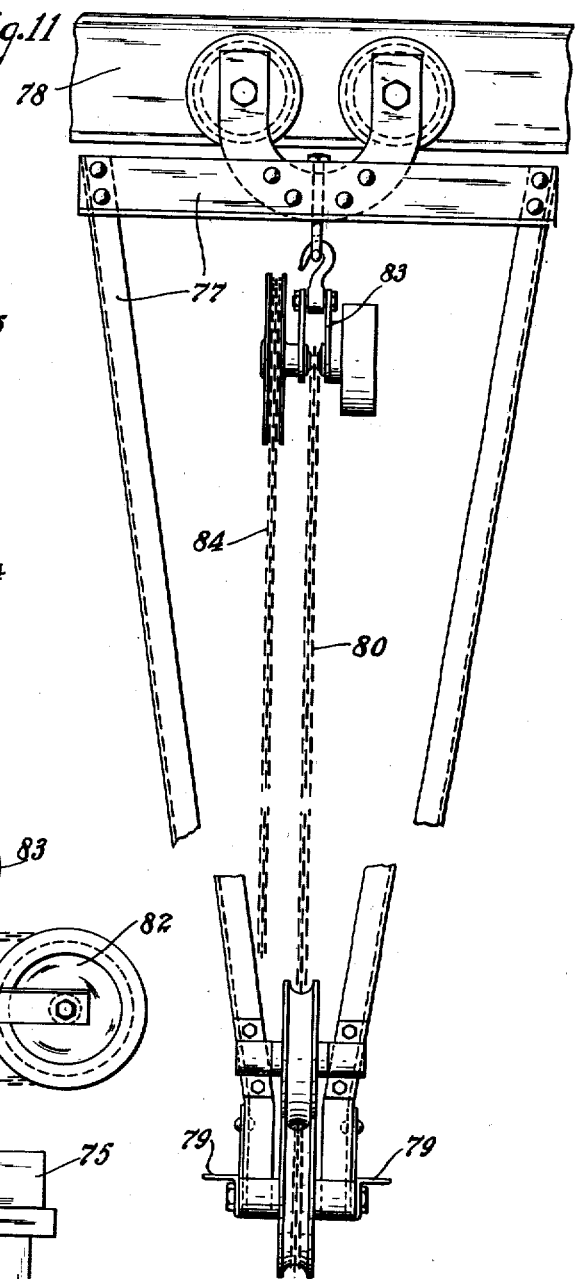
Inventor
Edw. J. Kroeger.
By Robert N. Pierson
Atty.

Patented Feb. 16, 1926.

1,573,497

UNITED STATES PATENT OFFICE.

EDWIN J. KROEGER, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING HOLLOW ARTICLES.

Application filed March 25, 1922. Serial No. 546,670.

*To all whom it may concern:*

Be it known that I, EDWIN J. KROEGER, a citizen of the United States, residing at Akron, in the county of Summit and State of Ohio, have invented a certain new and useful Method and Apparatus for Making Hollow Articles, of which the following is a specification.

This invention relates to the art of making hollow articles from plastic material, as in the case of molding battery jars from a vulcanizable rubber compound, and its chief objects are to provide an improved and rapid method of making such articles and improved apparatus for forming and molding the same.

More specific objects are to provide a method adapted to produce substantially even heating and vulcanization of all parts of a multiple-celled container, including the partition walls thereof, which latter, under methods heretofore used, have been heated less rapidly than the side walls of the container, and to provide a method and apparatus adapted to save labor by facilitating the removal of the article, after vulcanization, from the mandrel or mandrels on which it is vulcanized.

Of the accompanying drawings:

Fig. 2 is an elevation of the same, as viewed from the right of Fig. 1, with parts in section.

Fig. 3 is a plan view of a part of the apparatus represented by the line 3—3 in Fig. 1, with parts broken away and sectioned.

Fig. 4 is a section on line 4—4 of Fig. 1.

Fig. 7 is a side elevation, on a large scale, of the molding device.

Fig. 8 is a horizontal section, on line 8—8 of Fig. 7, the mold being slightly open.

Fig. 9 is a perspective view of a mold member.

Fig. 10 is an elevation of a modification.

Fig. 11 is an elevation of parts of said modification as viewed from the right of Fig. 7.

Figure 1:
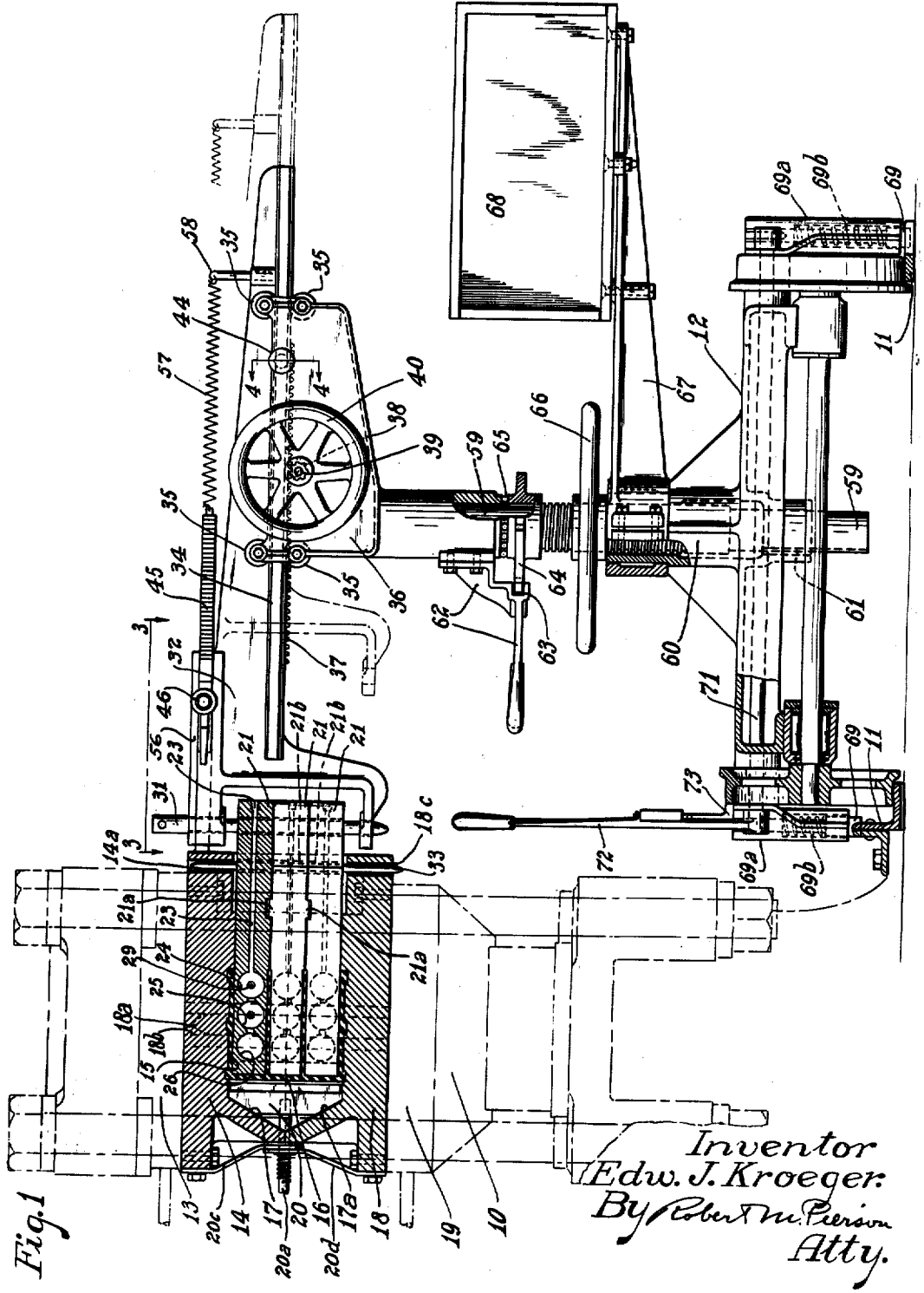
Fig. 1 is an elevation, with parts broken away and parts in section, of apparatus embodying and adapted to carry out my invention.

Referring to the drawings, 10 represents generally a hot-platen press, and preferably a plurality of such presses are arranged in a row. 11, 11 are the rails of a track running past said press or presses, and 12 represents generally a car mounted on said track and supporting apparatus presently to be described.

Secured to the lower face of the upper, fixed platen 13 of the press 10 is a mold member 14 formed centrally with a molding face 15 for one side of the work, here represented as a three-celled battery jar 16, and on three sides of said molding face said mold member is formed with plane, inner, wedging faces sloping outwardly from the work, the one of said wedging faces at the base of the jar being shown at 17, (Fig. 1). A mold member 18 of like form, inverted, is similarly mounted on the lower platen 19 of the press, two of its three wedging faces being shown at 17ª, 17ª (Figs. 1 and 8). Between the mold members 14, 18 are provided a pair of wedgeable, L-shaped mold or lining members adapted to be wedged inward, against the action of springs 20° presently to be described, by the sloping, wedging faces such as the faces 17 and 17ª of the mold members 14, 18, when the press is closed, to press the two vertical side faces and the bottom face of the jar, one of said wedgeable mold members, each of which is adapted to press half of the bottom face and the adjacent vertical side faces of the jar, being shown at 20 (Figs. 1, 8 and 9). 18ª, 18ª are dowel pins mounted on the lower mold member 18 and adapted to enter holes 18ᵇ, 18ᵇ in the upper mold member 14 to insure accurate registry of said mold members.

For automatically withdrawing the wedgeable mold members 20 from the work when the press is opened, to permit the removal of the molded jar and the insertion of another jar to be molded, said members are provided with stud-bolts 20ª, 20ª projecting therefrom through slots 20ᵇ, 20ᵇ at the parting plane of the mold (Figs. 7 and 8), at the sides and rear end of the latter, each of said stud bolts extending through the ends of links, 20°, 20°, the opposite ends of which are pivoted to the upper mold member 14. 20ᵈ, 20ᵈ are links pivoted on the lower mold member 18, their slotted ends being mounted on the stud-bolts 20ª and overlapping the links 20°. 20°, 20° are helical compression springs mounted on the outer ends of said stud bolts between retaining nuts thereon and the links 20ᵈ. Said springs are adapted, upon the opening of the press to draw the stud bolts through the links 20ᵈ and 20°, the latter bearing at their ends against the outer faces of the mold sections, to retract the wedgeable mold members 20 from the work, the wedging faces 17ª of the lower mold member being relieved of the weight of said wedgeable mold members by the links 20°, which links also assist the springs by swinging the wedgeable members away from the work by gravity and also by the force of the opening press, on occasion, as in case the lining members 20 stick to the work, each pair of the links 20°, 20ᵈ constituting a toggle which is straightened by the descent of the lower press platen 19, the slots in the ends of the links 20ᵈ being of such length as to limit the opening movement of the press and thus prevent the links 20° from passing off the side face of the lower mold member and possibly jamming against said member upon the subsequent closing of the press.

The wedgeable mold members 20 may be formed with overflow grooves, as shown at 20ˣ, (Figs. 8 and 9).

Figure 5:
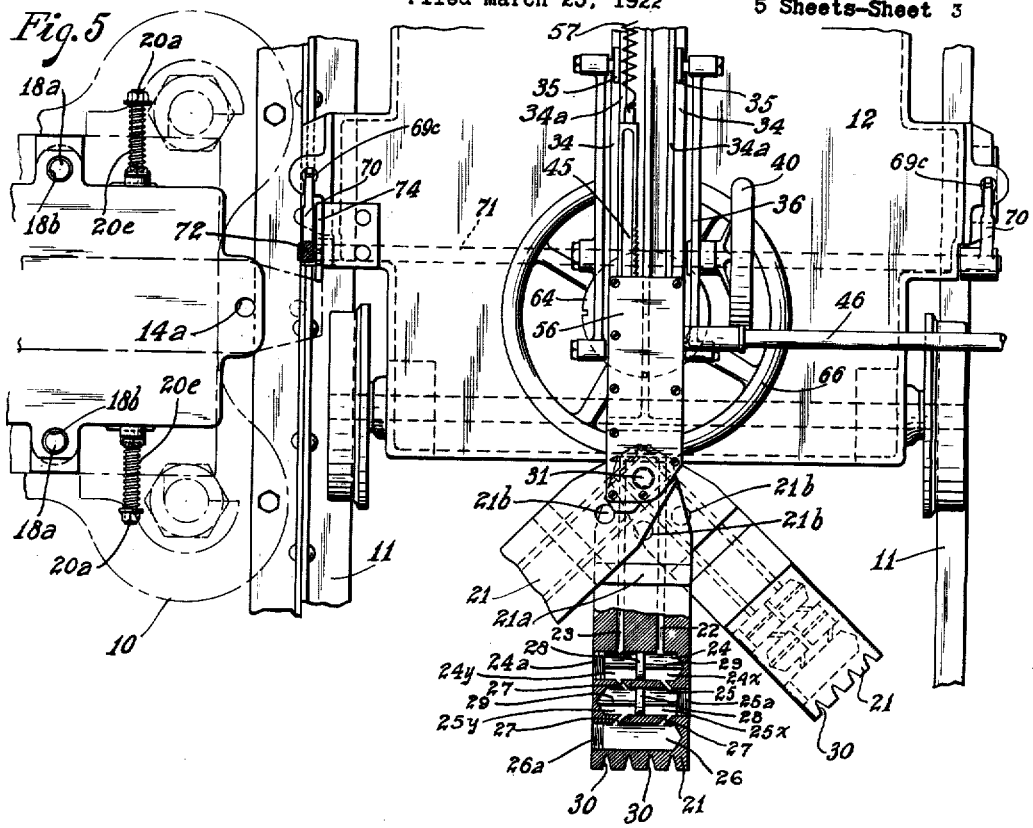
Fig. 5 is a plan view of the principal parts of the apparatus with the mandrels in work-receiving relation.
Figure 6:
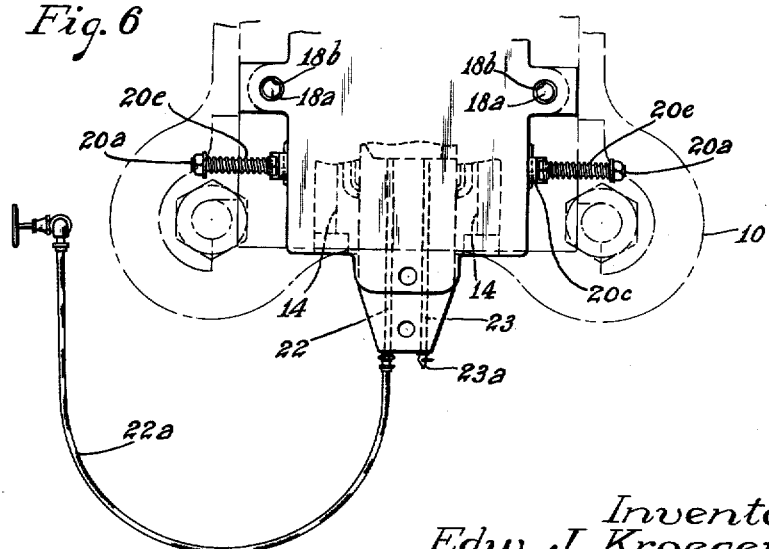
Fig. 6 is a fragmentary plan view of a vulcanizing press with the work therein.

For molding the cells in the jar I provide one or more mandrels 21, 21, here shown as three, each mandrel being hollow and formed with a steam inlet passage 22 and an outlet passage 23 therein for heating the mandrel, said passages respectively leading into and out of a series of connected steam chambers (Fig. 5). Said chambers, for convenience of construction, preferably are provided as shown, by a series of parallel recesses 24, 25, 26 bored laterally into the mandrel and closed by screw-plugs 24ª, 25ª, 26ª, respective end portions of adjacent chambers being connected by passages 27, 27, which passages, when positioned obliquely, as shown, may conveniently be bored, by access from the mouths of the recesses 24, 25, 26 before the screw plugs 24ª, 25ª, 26ª are inserted. Each of the recesses or chambers except the last of the series, 26, is centrally divided by a partition member or disc, 28, secured to a post 29, said post being clamped between the screw-plugs 24ª or 25ª and the bottom of the recess, to hold said disc in position to divide the recess into two compartments, or chambers, 24ˣ, 25ˣ, 24ʸ, 25ʸ, as is clearly shown in Fig. 5. The chambers as there shown are thus adapted to provide an effective circulation of steam through the mandrel, the steam passing from the passage 22, through the adjacent compartments 24ˣ, 25ˣ to the chamber 26, from which it returns through the compartments 25ʸ, 24ʸ to the outlet passage 23. A flexible hose for supplying steam to the passage 22 is provided for each mandrel, one of the same being shown at 22ª, (Fig. 6), and a pet cock 23ª is provided at the extremity of the passage 23 for venting the air from each mandrel.

The mandrels here shown are formed with the usual grooves 30, 30 at their work-engaging extremities for molding plate-supporting ribs on the inner face of the bottom of the battery jar.

At their extremities farthest from their work-receiving ends, the mandrels 21 are coaxially pivoted on a vertical, quickly-removable clevis-pin 31, between the arms of a forked mandrel-supporting and pulling bracket-member 32, on the car 12, said arms being sufficiently spaced apart to permit, on occasion, a vertical sliding movement of the mandrels on said pin. The middle one of the three mandrels here shown is formed on its upper and lower faces respectively with transverse ribs 21ª interfitting with grooves in the adjacent mandrels when the three mandrels are assembled in molding position, and said ribs are adapted to hold the work-receiving portions of the mandrels apart for the application of stock thereto when the mandrels are slid apart upon the clevis-pin 31 and swung apart fan-wise on said pin as shown in Fig. 5, the ribs 21ª then being out of registry with their slots in the adjacent mandrels.

The mandrels are so cut away on their adjacent faces at their work-receiving ends as to accommodate the stock comprising the partition members of the battery jar, while throughout the rest of their area said faces abut each other or the adjacent faces of the mold members 14, 18, when the press is closed upon the mandrels, the mandrels thus being adapted to be held very accurately in position with respect to each other and to the mold members, so as to insure uniformity in the size and shape of the jars. 33 (Fig. 1) is a quickly-removable dowel-pin mounted in the assembled mandrels, which are formed with registerable apertures 21ᵇ, 21ᵇ, therefor, the ends of said dowel-pin projecting above and below the mandrels and being adapted to enter holes 14ª, 18° in the respective mold members 14, 18, to hold the mandrels in position between the mold members against the pressure of the L-shaped wedgeable mold-members 20 as the press is closed, at which time the mandrels may have been disconnected from the bracket member 32 by withdrawal of the clevis-pin 31.

The mandrel-supporting and pulling bracket member 32 is provided at its respective sides with horizontal, two-faced, laterally projecting track-ways 34, 34, formed with guide-flanges 34ª, 34ª (Fig. 2), and is mounted between oppositely positioned sets of stud rollers 35, 35, journaled on upwardly extending forks of a turret member 36, and engaging the upper and lower faces of the track-ways 34.

The bracket member 32 is formed on the under side with a rack 37, between and parallel with the track-ways 34, and 38 is a drive-pinion meshed with said rack, said pinion being secured to a shaft 39 journaled in the forks of the turret member 36 and provided with a hand-wheel 40 for horizontally reciprocating the mandrel-supporting and pulling member 32.

For latching the bracket member 32 in fixed relation to the turret member 36, I provide a latch-bolt 41 slidably mounted in a sleeve 41ª extending through one of the forks of the turret member 36 and adapted to be engaged in a recess 42 (Fig. 4) formed in said bracket-member, said bolt being backed by a spring 43 (Fig. 4) and provided with a hand-knob 44 for retracting it to release said bracket member. The stem of said hand-knob is provided with a stop 44ª fitting into a recess in the sleeve 41ª when the bolt is in latching position, and adapted to bear against the end of said sleeve when the bolt is retracted and given a partial turn, to hold said bolt out of latching position.

In a longitudinal groove formed on the upper face of the bracket-member 32 is slidably mounted a ratch 45 having at its end a presser foot 45ª (Fig. 3) adapted to bear against the upper mold member 14 of the press 10 to force the mandrel-supporting and pulling member 32 away from the press through the action of said ratch. For actuating said ratch I provide a horizontal hand-lever 46 fulcrumed at 47 on the bracket-member 32, at which point is also pivoted a retaining pawl 48 adapted to engage said ratch under pressure of a spring-backed plunger 49 (Fig. 3) mounted in a recess in the bracket member 32 and bearing against an extension or heel 50 of said pawl back of its pivot. A driving pawl 51 associated with said ratch is pivoted at 52 on the lever 46 and connected with the retaining pawl 48 by a lost-motion link 53, whereby it is adapted, on occasion, to be disengaged from the ratch along with the retaining-pawl 48 by means of a handle 54 extending from the latter pawl, although permitted by said lost-motion link to run on and engage the teeth of the ratch while the retaining-pawl 48 is engaged. 55 is a spring-backed plunger mounted on the retaining pawl 48 for holding the driving pawl 51 in engagement with the ratch except at such times as the retaining pawl is swung free from the ratch by the handle 54, against the pressure of the plunger 49. 56 is a cover plate for the parts just described, secured upon the bracket-member 32. For holding the ratch 45 in step with the pawls 48, 51, and for automatically retracting said ratch when the pawls are lifted therefrom by the handle 46, a pull spring 57 (Figs. 1 and 5) is mounted between the rear end of the ratch and a post 58 rising from the bracket-member 32.

The member 36 is rotatably mounted upon a vertical post 59, said post being slidably mounted in a vertical guide-standard 60 upon the car 12 and splined against turning therein, as indicated at 61 (Fig. 1). For turning said member 36, and the bracket member 32 and other parts carried thereby, and securing them in different rotative positions, the member 36 is provided with a hand-lever 62 having a sliding latch-pawl 63 (Fig. 1) associated with a ratchet member 64 secured upon the post 59. 65 is a ball-bearing between the member 36 and a shoulder provided by the ratchet-member 64. The post 59 is threaded for a distance below the ratchet-member 64, and 66 is a hand wheel formed with a female-threaded hub, mounted upon the threaded part of said post and resting upon the upper end of the guide-standard 60, for raising and lowering said post.

Clamped upon the upper end of the guide-standard 60 is a bracket 67, extending to the side of the car 12 opposite the press 10 and at its end supporting an open-sided box 68 adapted to contain stock and to support stock, tools or the mandrels 21 upon its roof.

For securing the car 12 exactly in position in front of the press 10, said car is provided with a sliding, spring-backed latch-pawl 69, at each side, said pawls being mounted in vertical guides 69ª, 69ª, secured to the car frame. Said pawls are adapted to engage in notches formed in the respective rails 11, and to be simultaneously lifted from said notches, against their springs 69ᵇ, by respective arms 70, 70 extending from a rock-shaft 71 extending across the car and mounted in the frame thereof, each arm 70 extending through a slot in the guide 69ª and engaging a pin 69ᶜ (Fig. 2) mounted in the forked upper end of the pawl 69. For turning the rock-shaft 71 and holding the pawls 69 in or out of engagement with the notches in the rails 11, a hand lever 72 is secured to one end of said rock-shaft and provided with the usual sliding, spring-backed latch-pawl 73, coacting with a segmental ratchet 74 secured to the frame of the car.

In the operation of the apparatus, assuming the parts to be in the positions shown in Fig. 1, the vulcanization of the battery jar 16 being completed, the car 12 secured in position in front of the press 10 and the mandrel-supporting and pulling member being connected with the mandrels 21 by the clevis-pin 31, the press 10 is relieved of its compression and may be slightly opened, but not so far opened as to clear either of the mold members from the battery jar. The dowel pin 33 is then driven out, and the ratch 45 is forced against the mold-member 14 by oscillating the hand-lever 46, to drive the bracket-member 32 away from the press and thereby loosen the mandrels 21 from the work. When the mandrels have thus been started, the hand-wheel 40 is turned and, through the pinion 38 and rack 37, rapidly withdraws the mandrels from the press, from which latter the finished battery jar may then be removed upon the further opening of the press, at which time the L-shaped, wedgeable, mold or lining members 20 are spread apart, by the links 20ᵉ and the springs 20ᵍ, as above described, to receive the next jar between them.

The mandrels, being clear of the press, are carried by the member 32 while the latter is turned through half a revolution by means of the lever 62 and latched against further turning by the pawl 63, the mandrels then being over the box 68. While the mandrels are out of the press, battery jar stock is assembled upon them in substantially the form of the finished jar 16, the stock being sufficiently pressed by hand to cause it to retain its relation to the mandrels. This jar assembling operation may be performed by turning the hand-wheel 66 to lower the mandrels onto the box 68 on a sheet of side-wall stock laid thereon, sliding all but the lower mandrel upward on the clevis-pin 31 and spreading them fan-wise as shown in Fig. 5, the ribs 21ᵃ holding them spaced apart vertically, laying sheets of partition stock upon the upper face of each of the mandrels except the uppermost one, turning them back together upon the pin 31 until the ribs 21ᵃ enter their grooves and permit the mandrels to come together upon the partition stock, inserting strips of rib-forming stock in the grooves 30, and then applying the bottom stock to the assembled mandrels and folding the side-wall stock around them.

The jar being thus built on the mandrels, the turret-member 36 is turned back to present the mandrels to the press, into which they, with the newly-built jar upon them, are inserted by turning the hand wheel 40, the ratch 45 meanwhile having been released by the handle 54 and retracted by the spring 57. The dowel pin 33 is then inserted through the mold members 14, 18 and the mandrels, the clevis-pin 31 withdrawn, and the press closed, wedging the L-shaped mold or lining members 20 against the base and the vertical side faces of the jar. The latter is then vulcanized by steam applied to the interior of the mandrels through the hose 22ᵃ and also to the platens 13 and 19. To facilitate the registering of the holes 21ᵇ of the mandrels with the holes 14ᵃ, 18ᶜ of the mold members, and also to secure the member 32 in fixed relation to the turret member 36 after the mandrels have been pulled from a jar, the latch-bolt 41 may be permitted to enter holes, such as the hole 42, appropriately positioned in the member 32.

When the mandrels have been inserted in the press and the member 32 has been disconnected from them by withdrawal of the clevis-pin 31, the car-holding pawls 69 are lifted by means of the lever 72 and the car is moved along the rails 11 to the next press, there to repeat the operation of pulling the mandrels from said press and reinserting them with a new jar thereon.

In the modification shown in Figs. 10 and 11, a table 75 is provided adjacent the press 10 for supporting the modified mandrels 21ˣ, 21ˣ, there shown diagrammatically, and 76 is an eye-bolt anchored in the end of the middle mandrel for pulling the mandrels from the vulcanized jar, the ribs 21ᵃ interlocking with the adjacent mandrels to compel the latter to move with the middle one.

For exerting the pulling force upon the mandrels a traveling frame 77 is provided, said frame being suspended from an overhead track 78 and having at its lower end a pair of horizontal X-beams 79, 79 adapted to bear against the upper mold member 14 of the press 10, as clearly shown in Fig. 10. 80 is a load chain provided at one end with a hook 81 adapted to engage the eye of the bolt 76, said chain being mounted upon a guide pulley 82, journaled between the beams 79 at their rear ends, and upon a guide pulley 83 journaled nearer the middle of the frame, from which latter pulley said chain passes to a chain block 83, which may be of any known or preferred construction, suspended from the upper part of the frame and provided with a hand-chain 84 for pulling the load chain 80 with a large mechanical advantage, to withdraw the mandrels from the battery jars.

The traveling frame 77 may be moved along the over-head track 78 to successive presses to pull the mandrels from finished battery jars held therein, and the mandrels, with newly built, unvulcanized jars thereon, are re-inserted in the presses by hand.

In making the jar by my method the vulcanizing heat being applied thereto through the several mandrels as well as through the mold, the partitions of the jar may be heated as quickly as the side-walls and bottom, and substantially uniform vulcanization and compact, cohesive condition of all parts of the jar is thereby obtained.

With the apparatus described, molding pressure may be applied transversely to the entire outer surface of the jar, so that a minimum of excess stock and flow thereof is required to assure coalescing of the several parts of the jar. The removal of the mandrels from the jar is accomplished rapidly and with a minimum of handling, so that time and labor are saved and breakage of jars is avoided, the jar, during the mandrel-pulling operations being held in position by the mold surfaces against which it was molded and with which it snugly fits.

The employment of the lining members 20 in the mold, together with means for appropriately moving them with relation to the mold, permits ready and, if necessary, forcible, dislodgment of all external molding members from the work, and at the same time provides for their ready reassembly in molding relation.

Further modifications may be resorted to without departing from the scope of my invention, and I do not wholly limit my claims to the particular embodiment thereof here shown.

I claim:

1. The method of making a multiple-celled container from plastic material which comprises assembling partition-forming sheets of said material in spaced relation, applying side-wall and bottom-forming sheets of said material to said assembled partition-forming sheets, and applying heat to the container thus assembled, from a heating medium circulated through the cells thereof, while applying molding pressure to the partitions, side walls and bottom of said container.

2. The method of making a container consisting of a hardening plastic which comprises molding the container upon a mandrel by molding pressure applied transversely of its height, causing the plastic material of the container to harden, and withdrawing the mandrel while holding the container by interlocked engagement thereof with the transverse-pressure-applying means.

3. Apparatus for molding a multiple-celled container, said apparatus comprising a set of mandrels adapted to be assembled alternately with sheets of partition-forming stock and to abut each other outside of the container while accommodating the partitions thereof between their work-receiving ends, means for applying external molding pressure to a container with said mandrels and pressing said mandrels together, and means for internally heating the work-engaging ends of said mandrels.

4. In apparatus for molding a multiple-celled container, the combination of a set of hollow mandrels adapted to be assembled alternately with sheets of partition-forming material, means for applying external molding pressure to a container assembled with said mandrels, and means for circulating a heating fluid through the interiors of said hollow mandrels.

5. In apparatus for making a hollow article from plastic material, the combination of a mandrel for internally molding the article, means for internally heating said mandrel, a pair of outer mold members adapted to press outer side faces of the article, and a pair of L-shaped mold members adapted to be forced against the article by said pair of outer mold members to press side faces and an enclosed end of the article.

6. In apparatus for making a hollow article from plastic material, the combination of a mandrel for internally molding the article, means for internally heating said mandrel, an outer mold member, means for forcing said outer mold member against a side wall of an article mounted on said mandrel, a mold member adapted to be forced by the first said mold member against the bottom of said article, and a dowel member adapted to hold said first mold member and said mandrel against relative movement under pressure of said second mold member.

7. In apparatus of the character described, the combination of a fixed mold member, movable mold members associated therewith, and a mandrel pulling device adjacent said fixed mold member and including a movable member positionable thereagainst and adapted to coact therewith to force the mandrel therefrom.

8. In apparatus of the character described, the combination of a plurality of platen presses, a pair of mold members mounted on the platens of each press, and a mobile mandrel manipulating device positionable adjacent the several presses.

9. In apparatus of the character described, the combination of a press, a track adjacent said press, a car mounted on said track, a turret member mounted on said car, and a mandrel manipulating device mounted on said turret.

10. In apparatus for making a multiple-celled container, a set of mandrels adapted to be assembled alternately with partition-forming sheets of stock, said mandrels being adapted to abut each other outside of a container formed thereon while accommodating said partition-forming sheets between their work-receiving portions, and interlocking means lying wholly within the combined dimensions of the assembled mandrels for registering them with each other and preventing their separate removal from the work.

11. In apparatus for making a multiple-celled container, a set of mandrels adapted to be assembled alternately with partition-forming sheets of stock, adjacent mandrels being formed respectively with a recess and a projection adapted to enter said recess to hold said mandrels in registry, and a pivotal mounting for said mandrels, said mandrels being slidably mounted thereon, and said projection being adapted to hold said mandrels apart when the latter are turned out of registry upon said pivotal mounting.

12. In an apparatus of the character described, the combination of a platen press, a mold member mounted upon a platen of said press, a mandrel pulling member adjacent said press, a ratch slidably mounted on said pulling member, and a lever pivoted on said pulling member for actuating said ratch.

13. In apparatus of the character described, the combination of a press, a turret-member adjacent said press, a mandrel manipulating member mounted on said turret member, and a rack-and-pinion mechanism for moving said mandrel manipulating member relatively to said turret member.

14. In apparatus of the character described, the combination of a press, a turret-member adjacent said press, a mandrel pulling and supporting member movably mounted on said turret member, a rack-and-pinion mechanism for moving said mandrel pulling member relatively to said turret member, and a lever mechanism adapted to start said pulling member from said press.

15. In apparatus of the character described, the combination of a press, a mandrel manipulating member adjacent said press, said member being formed with a fork, a clevis-pin detachably mounted in the arms of said fork, and a set of mandrels pivoted on said clevis-pin, said mandrels being adapted to be assembled alternately with sheets of stock and to be slid and turned away from each other on said pin to receive said stock.

16. In apparatus of the character described, the combination of a press, a track adjacent said press, a car mounted on said track, a rotatable member mounted on said car, a mandrel manipulating member movably mounted upon said rotatable member, and a latch member for securing said manipulating member and said rotatable member in fixed relative positions.

17. In apparatus of the character described, the combination of a press, a track adjacent said press, a car mounted on said track, a rotatable member mounted on said car, a mandrel manipulating member movably mounted upon said rotatable member, and means for raising and lowering said rotatable member with respect to said car.

18. In apparatus of the character described, the combination of a press, a track adjacent said press, a car mounted on said track, a rotatable member mounted on said car, a mandrel manipulating member movably mounted upon said rotatable member, a threaded vertical post supporting said rotatable member, said post being slidably and non-rotatably mounted on said car, and a hand wheel formed with a female-threaded hub mounted on the threaded part of said post for raising and lowering the latter.

19. In apparatus of the character described, the combination of a press, a track adjacent said press, a car mounted on said track, a rotatable member mounted on said car, a mandrel manipulating member movably mounted upon said rotatable member, and means for securing said rotatable member in different rotative positions.

20. In apparatus of the character described, the combination of a press, a track adjacent said press, a car mounted on said track, a rotatable member mounted on said car, a mandrel manipulating member movably mounted upon said rotatable member, a threaded vertical post supporting said rotatable member, said post being slidably and non-rotatably mounted on said car, and a hand wheel formed with a female-threaded hub mounted on the threaded part of said post for raising and lowering the latter, a pawl-lever secured to said rotatable member and a ratchet secured to said post for turning said rotatable member and securing it in different rotative positions.

21. In apparatus of the character described, the combination of a press, a track adjacent said press, a car mounted on said track, a mandrel manipulating device mounted on said car, and a pawl member mounted on said car and adapted to bear against a fixed part of said track to secure said car against movement thereon.

22. In apparatus of the character described, the combination of a press, a track adjacent said press, a car mounted on said track, a rotatable member mounted on said car, a mandrel manipulating member movably mounted upon said rotatable member, and a work-supporting member mounted on said car and adapted to receive a mandrel mounted on said mandrel manipulating member.

23. In apparatus for making a hollow article from plastic material, the combination of a mandrel for internally molding the article, a pair of outer mold members adapted to press outer side faces of the article, wedgeable mold members adapted to be wedged against other faces of said article by said outer mold members, and yielding means, opposed to such movement of said wedgeable mold members, for retracting them when said outer mold members are retracted.

24. In apparatus for making a hollow article from plastic material, the combination of a mandrel for internally molding the article, an upper mold member, a lower mold member, a pair of L-shaped wedgeable mold members adapted to be wedged against the work by said upper and lower mold members and having stud-bolts projecting to the exterior of said upper mold member, links pivoted to said upper mold member and having apertured lower ends slidably mounted on said stud bolts, so as to act as supports for said wedgeable mold members, and springs interposed operatively between said links and said stud bolts for urging said wedgeable mold members away from the work.

25. In apparatus of the character described, a mandrel formed with adjacent recesses from the opposite faces thereof and with a plurality of apertures connecting said recesses, a partition member secured in one of said recesses between said apertures, and closure members threaded into said recesses.

26. Apparatus for making a multiple-celled container from plastic material, said apparatus comprising a set of mandrels adapted to be assembled alternately with partition-forming sheets of material, means for internally heating said mandrels, and means for simultaneously applying direct, transverse pressure to substantially the entire side walls and bottom of a container assembled on said mandrels.

27. In apparatus of the character described, the combination of a press, a turret-member adjacent said press, and a mandrel manipulating and supporting member mounted on said turret member.

28. In molding and vulcanizing apparatus the combination of a mold, a plurality of separable lining members in the mold having extensive, heat conductive, face-to-face contact therewith, an internal molding member, power actuated means for exerting molding pressure on the mold, means for separating the lining members and the internal molding members, means adapted as an incident of reverse movement of the said power actuated means to force relative movement to the mold and lining member, and means for subjecting the mold to vulcanizing heat.

29. In apparatus for molding hollow articles the combination of an external mold structure and an internal molding member, said external mold structure comprising a plurality of external side-shaping members and a backing therefor, means for forcing relative movement of the external side-shaping members and the internal molding member to mold the article, and means adapted to effect reverse relative movement thereof and concurrently to effect relative movement of the external side-shaping members and their backing member.

30. In apparatus for molding hollow articles the combination of an external mold structure and an internal molding member, said external mold structure comprising a plurality of external side-shaping members having external faces oblique to their shaping faces and a complementally formed backing member slidably fitting said oblique faces in extensive, heat-conductive contact, means for circulating a heating fluid to heat the said backing member, and means adapted in a single movement thereof to effect separation of the internal molding member and the side-shaping members and relative movement of the latter and their backing member.

In witness whereof I have hereunto set my hand this 23 day of March, 1922.

EDWIN J. KROEGER.

the work by said upper and lower mold members and having stud-bolts projecting to the exterior of said upper mold member, links pivoted to said upper mold member and having apertured lower ends slidably mounted on said stud bolts, so as to act as supports for said wedgeable mold members, and springs interposed operatively between said links and said stud bolts for urging said wedgeable mold members away from the work.

25. In apparatus of the character described, a mandrel formed with adjacent recesses from the opposite faces thereof and with a plurality of apertures connecting said recesses, a partition member secured in one of said recesses between said apertures, and closure members threaded into said recesses.

26. Apparatus for making a multiple-celled container from plastic material, said apparatus comprising a set of mandrels adapted to be assembled alternately with partition-forming sheets of material, means for internally heating said mandrels, and means for simultaneously applying direct, transverse pressure to substantially the entire side walls and bottom of a container assembled on said mandrels.

27. In apparatus of the character described, the combination of a press, a turret-member adjacent said press, and a mandrel manipulating and supporting member mounted on said turret member.

28. In molding and vulcanizing apparatus the combination of a mold, a plurality of separable lining members in the mold having extensive, heat conductive, face-to-face contact therewith, an internal molding member, power actuated means for exerting molding pressure on the mold, means for separating the lining members and the internal molding members, means adapted as an incident of reverse movement of the said power actuated means to force relative movement to the mold and lining member, and means for subjecting the mold to vulcanizing heat.

29. In apparatus for molding hollow articles the combination of an external mold structure and an internal molding member, said external mold structure comprising a plurality of external side-shaping members and a backing therefor, means for forcing relative movement of the external side-shaping members and the internal molding member to mold the article, and means adapted to effect reverse relative movement thereof and concurrently to effect relative movement of the external side-shaping members and their backing member.

30. In apparatus for molding hollow articles the combination of an external mold structure and an internal molding member, said external mold structure comprising a plurality of external side-shaping members having external faces oblique to their shaping faces and a complementally formed backing member slidably fitting said oblique faces in extensive, heat-conductive contact, means for circulating a heating fluid to heat the said backing member, and means adapted in a single movement thereof to effect separation of the internal molding member and the side-shaping members and relative movement of the latter and their backing member.

In witness whereof I have hereunto set my hand this 23 day of March, 1922.

EDWIN J. KROEGER.

Certificate of Correction.

It is hereby certified that in Letters Patent No. 1,573,497, granted February 16, 1926, upon the application of Edwin J. Kroeger, of Akron, Ohio, for an improvement in "Methods and Apparatus for Making Hollow Articles," errors appear in the printed specification requiring correction as follows: Page 5, line 56, claim 3, after the word "container" insert the word *assembled;* page 7, line 43, claim 28, for the word "members" read *member;* line 46, for the word "to" read *of;* and line 47, for the word "member" read *members;* and that the said Letters Patent should be read with these corrections therein that the same may conform to the record of the case in the Patent Office.

Signed and sealed this 13th day of April, A. D. 1926.

[SEAL.]

M. J. MOORE,
*Acting Commissioner of Patents.*

Certificate of Correction.

It is hereby certified that in Letters Patent No. 1,573,497, granted February 16, 1926, upon the application of Edwin J. Kroeger, of Akron, Ohio, for an improvement in "Methods and Apparatus for Making Hollow Articles," errors appear in the printed specification requiring correction as follows: Page 5, line 56, claim 3, after the word "container" insert the word *assembled;* page 7, line 43, claim 28, for the word "members" read *member;* line 46, for the word "to" read *of;* and line 47, for the word "member" read *members;* and that the said Letters Patent should be read with these corrections therein that the same may conform to the record of the case in the Patent Office.

Signed and sealed this 13th day of April, A. D. 1926.

[SEAL.] 
M. J. MOORE,
*Acting Commissioner of Patents.*